(12) United States Patent
Mayer et al.

(10) Patent No.: US 11,774,552 B2
(45) Date of Patent: Oct. 3, 2023

(54) EVALUATION DEVICE AND METHOD FOR EVALUATING AT LEAST ONE RADAR SENSOR WHILE PAUSING FOR HEATING OF RADAR COMPONENTS

(71) Applicant: Robert Bosch GmbH, Stuttgart (DE)

(72) Inventors: Marcel Mayer, Lonsee (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 569 days.

(21) Appl. No.: 16/978,009

(22) PCT Filed: Apr. 12, 2019

(86) PCT No.: PCT/EP2019/059578
§ 371 (c)(1),
(2) Date: Sep. 3, 2020

(87) PCT Pub. No.: WO2019/242904
PCT Pub. Date: Dec. 26, 2019

(65) Prior Publication Data
US 2020/0408879 A1 Dec. 31, 2020

(30) Foreign Application Priority Data
Jun. 21, 2018 (DE) .................. 10 2018 210 083.7

(51) Int. Cl.
*G01S 7/35* (2006.01)
*G01S 7/41* (2006.01)
*G01S 13/58* (2006.01)

(52) U.S. Cl.
CPC .............. *G01S 7/354* (2013.01); *G01S 7/415* (2013.01); *G01S 13/583* (2013.01); *G01S 13/584* (2013.01); *G01S 7/356* (2021.05)

(58) Field of Classification Search
CPC ........ G01S 7/354; G01S 7/415; G01S 13/583; G01S 13/584; G01S 7/356; G01S 13/931; G01S 13/343; G01S 7/2926
See application file for complete search history.

(56) References Cited

U.S. PATENT DOCUMENTS

| 2016/0124075 A1* | 5/2016 | Vogt ...................... G01S 13/536 |
| | | 342/13 |
| 2017/0131396 A1* | 5/2017 | Schoor ................ G01S 13/0209 |
| 2020/0278444 A1* | 9/2020 | Va .......................... G01S 13/89 |

FOREIGN PATENT DOCUMENTS

| DE | 102013210256 A1 | 12/2014 |
| DE | 102014212281 A1 | 12/2015 |

(Continued)

OTHER PUBLICATIONS

International Search Report for PCT/EP2019/059578, dated Jun. 25, 2019.

*Primary Examiner* — Donald HB Braswell
(74) *Attorney, Agent, or Firm* — NORTON ROSE FULBRIGHT US LLP; Gerard Messina

(57) ABSTRACT

An evaluation device for at least one radar sensor having an electronic unit which is designed to evaluate measuring signals of the radar sensor. The radar sensor is designed in such a way that, during its measuring cycles, it emits radar signals and to receive radar signals reflected from an area surrounding the radar sensor and outputs signals corresponding to the received reflected radar signals as measuring signals, while the radar sensor remains inactive for a predetermined pause time between two successive measuring cycles. The electronic unit is designed to perform a Fourier transform utilizing measuring signals from at least two different measuring cycles and/or utilizing evaluation signals derived from the measuring signals from at least two (Continued)

different measuring cycles. A corresponding method for evaluating at least one radar sensor is also described.

10 Claims, 3 Drawing Sheets

(56) References Cited

FOREIGN PATENT DOCUMENTS

| | | |
|---|---|---|
| DE | 102016202112 A1 | 8/2017 |
| DE | 102016221947 A1 | 5/2018 |
| EP | 3098623 A1 | 11/2016 |
| EP | 3173812 A1 | 5/2017 |

* cited by examiner

EVALUATION DEVICE AND METHOD FOR EVALUATING AT LEAST ONE RADAR SENSOR WHILE PAUSING FOR HEATING OF RADAR COMPONENTS

FIELD

The present invention relates to an evaluation device for at least one radar sensor and a radar device. In addition, the invention relates to a method for evaluating at least one radar sensor.

BACKGROUND INFORMATION

The use of radar sensors to sense the surroundings is familiar from the related art. For example, German Patent Application No. DE 10 2016 221 947 A1 describes a radar sensor for motor vehicles for sensing the respective vehicle environment.

SUMMARY

The present invention provides an evaluation device for at least one radar sensor, a radar device, and a method for evaluating at least one radar sensor.

Example embodiments of the present invention provide capabilities for evaluating at least one radar sensor whose measuring cycles are interrupted in each instance by an intervening pause time, the present invention permitting "uninterrupted observation" of an area surrounding the radar sensor over at least two measuring cycles, in spite of the maintenance of the pause times.

This may also be paraphrased to the effect that an "integration time" in evaluating the at least one radar sensor is increased with the aid of the present invention. Therefore, the present invention ensures improved Doppler resolution and a higher signal-to-noise ratio/signal-to-background ratio (Signal Noise Ratio, SNR) in the evaluation of the at least one radar sensor. Consequently, increased sensitivity and/or greater range may also be obtained in the evaluation of the at least one radar sensor by use of the present invention. The advantages described here are able to be realized utilizing the present invention, without having to shorten the pause times or reduce a duty cycle as well.

In one advantageous specific embodiment of the evaluation device in accordance with the present invention, the electronic unit is designed to perform the Fourier transform with respect to a variable relevant in terms of the Doppler effect, utilizing the measuring signals from at least two different measuring cycles and/or utilizing the evaluation signals derived from the measuring signals from at least two different measuring cycles. As becomes clear from the further description, the specific embodiment of the evaluation device described here therefore makes it possible to improve the Doppler separation capability in evaluating the at least one radar sensor.

Preferably, the electronic unit is designed to perform a Fourier transform with respect to a baseband frequency for each chirp of the at least two different measuring cycles, and thus in each instance to determine a plurality of Fourier series for each measuring cycle of the at least two different measuring cycles, and to perform the Fourier transform carried out employing the evaluation signals derived from the measuring signals from at least two different measuring cycles, by utilizing the plurality of Fourier series of the at least two different measuring cycles and/or utilizing evaluation signals derived from the plurality of Fourier series of the at least two different measuring cycles. A specific embodiment of the evaluation device in accordance with the present invention described herein may thus be used without difficulty for a chirp sequence method.

Preferably, the electronic unit is designed to perform a further Fourier transform with respect to a Doppler frequency for each measuring cycle of the at least two different measuring cycles utilizing the plurality of Fourier series determined for the respective measuring cycle, and thus in each instance to determine a 2-dimensional Fourier array for the respective measuring cycle, and to perform the Fourier transform carried out employing the evaluation signals derived from the measuring signals from at least two different measuring cycles, by utilizing the 2-dimensional Fourier arrays of the at least two different measuring cycles. Consequently, the evaluation device is designed to expand an evaluation of the at least one radar sensor, realized with the aid of the initially performed Fourier transforms for determining the 2-dimensional Fourier arrays for all measuring cycles of the at least one radar sensor, by a so-called third dimension. Namely, this results in better Doppler resolution and a higher signal-to-noise ratio in the evaluation of the at least one radar sensor.

The advantages described above are also brought about in the case of a radar device having such an evaluation device and the at least one radar sensor. For example, the at least one radar sensor may in each case be an FMCW radar sensor and/or a JSFMCW radar sensor. Consequently, these advantageous types of sensors may also be used to realize the present invention.

In addition, implementation of a corresponding example method for evaluating at least one radar sensor provides the advantages described above, as well. The example method for evaluating at least one radar sensor may easily be further developed in such a way that the advantages of the specific embodiments of evaluation devices and radar devices described above are ensured.

BRIEF DESCRIPTION OF THE DRAWINGS

Further features and advantages of the present invention are explained below with reference to the figures.

DETAILED DESCRIPTION OF EXAMPLE EMBODIMENTS

Figure 1A:
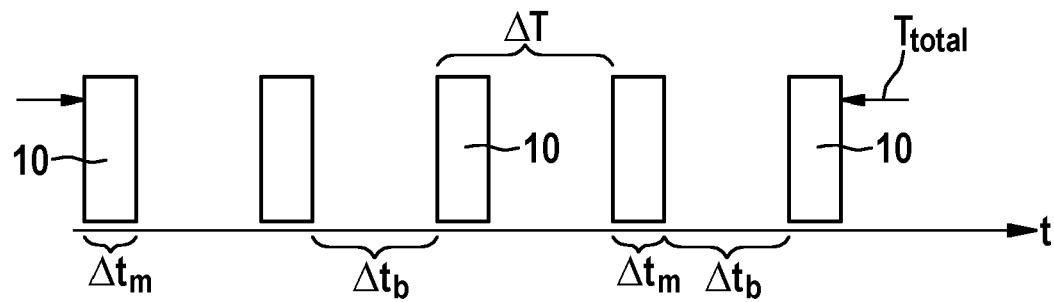
FIG. 1a through 1c show functional schemata for elucidating one specific embodiment of the method for evaluating at least one radar sensor in accordance with the present invention.
Figure 1B:
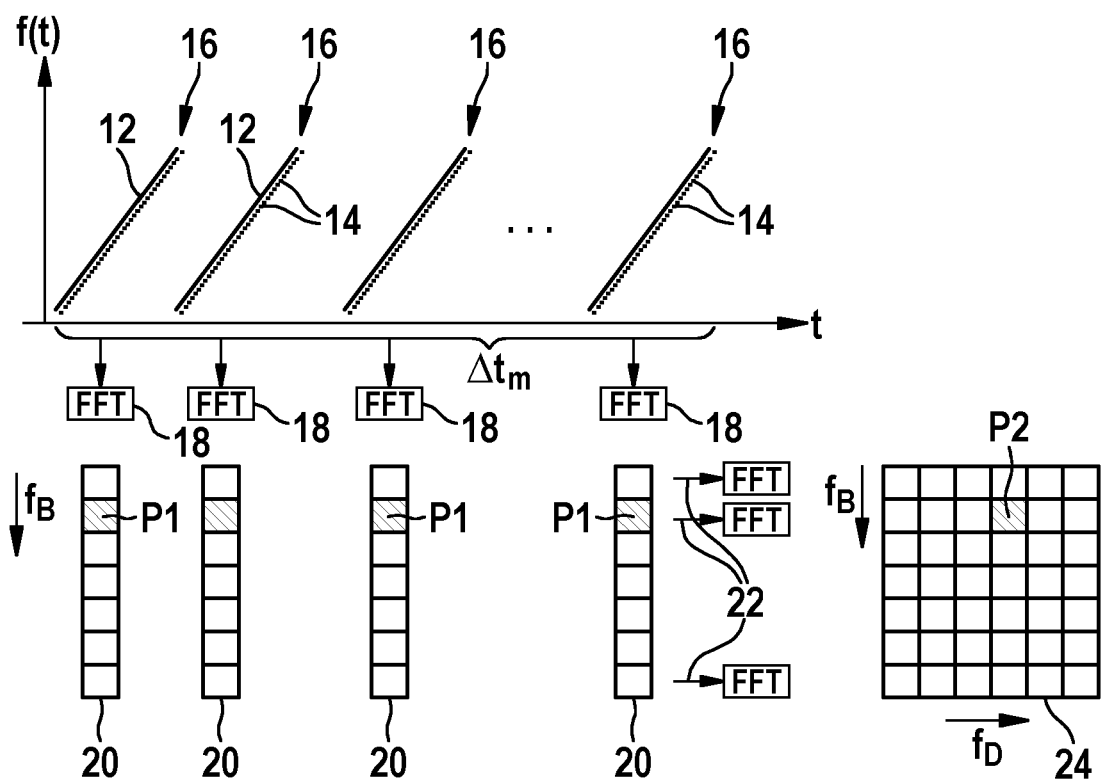
Figure 1C:
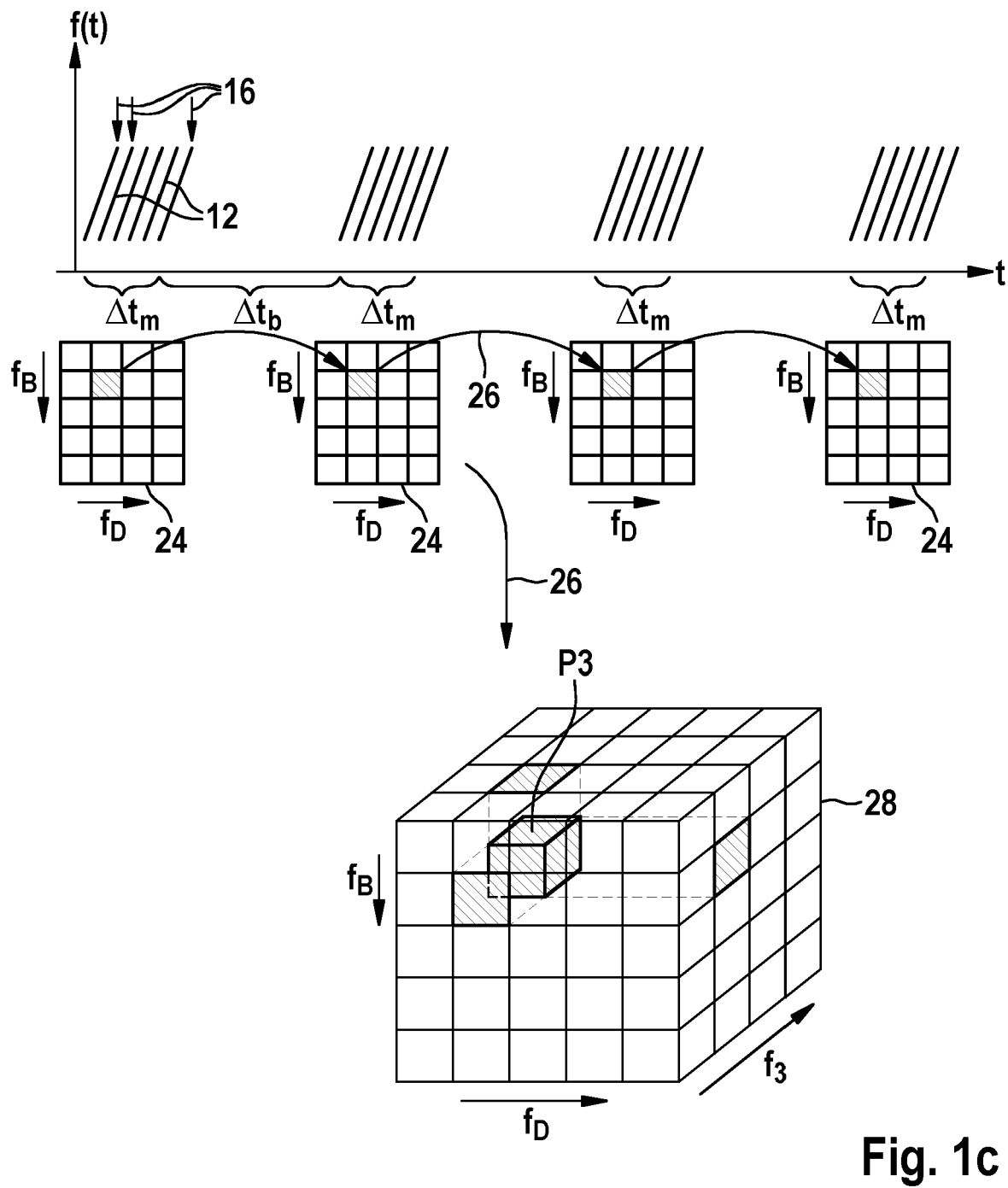

FIG. 1a through 1c show functional schemata to elucidate one specific embodiment of the method for evaluating at least one radar sensor in accordance with the present invention.

The method described hereinafter may be carried out to evaluate a multiplicity of radar sensors. Merely by way of example, only one radar sensor is evaluated utilizing the method described below. The specific radar sensor is used preferably to determine information regarding at least a partial area surrounding the radar sensor. The particular radar sensor may be part of a monitoring system, for example, and/or part of a vehicle guidance system.

As an example, in the method described here, the radar sensor is an FMCW (Frequency Modulated Continuous Wave) radar sensor, particularly a JSFMCW (Joint Sampling Frequency Modulated Continuous Wave) radar system. Such a radar sensor is very efficient in terms of its resources and allows good resolution of ambiguities. The advantages of FMCW radar sensors, or more specifically JSFMCW radar sensors, may thus be exploited together with the advantages of the method described hereinafter. However, feasibility of the method described in the following is not limited to the use of one of these types of radar sensors. For example, the radar sensor may also be an OFDM (Orthogonal Frequency-Division Multiplexing) radar sensor or a PN (Pseudo-random Noise) radar sensor.

During its measuring cycles 10, each having a measuring-cycle time/measuring-cycle duration $\Delta t_m$, the radar sensor emits radar signals 12. During its measuring cycles 10, the radar sensor likewise receives radar signals 14 reflected from its surroundings and outputs signals corresponding to received reflected radar signals 14 as measuring signals. In the functional schema of FIGS. 1b and 1c, the particular coordinate system has time axis t as abscissa, while time-dependent frequencies f(t) of radar signals 12 emitted by the radar sensor and radar signals 14 reflected from its surroundings are represented with the aid of its ordinate.

Merely illustratively, the radar sensor in the example of FIG. 1a to 1c is designed to carry out chirp sequence modulations, so that a plurality of chirps 16, preferably at least 100 chirps 16 are implemented during a single measuring cycle 10 having measuring-cycle time $\Delta t_m$. As a rule, measuring-cycle time $\Delta t_m$ lies between 1 ms (millisecond) and 40 ms (milliseconds). For instance, measuring-cycle time $\Delta t_m$ may be 20 ms (milliseconds). Between two successive measuring cycles 10, the radar sensor remains inactive for a predetermined pause time/pause duration $\Delta t_b$. Preferably, pause time $\Delta t_b$ is selected in such a way that heating of the radar-sensor components is prevented owing to pause time $\Delta t_b$ observed in each case between two successive measuring cycles 10. For example, pause time $\Delta t_b$ may be between 5 ms (milliseconds) and 100 ms (milliseconds). A sum of measuring-cycle time $\Delta t_m$ and pause time $\Delta t_b$ yields a total cycle time/total cycle duration $\Delta T$. A quotient of measuring-cycle time $\Delta t_m$ divided by total cycle time $\Delta T$ is often referred to as a duty cycle.

The measuring signals output by the radar sensor preferably represent frequency differences between radar signals 12 emitted by the radar sensor and radar signals 14 reflected from its surroundings. These frequency differences are made up of a distance-dependent portion and a relative speed-dependent/Doppler effect-caused portion. The distance-dependent portion indicates at what specific distance from the radar sensor at least one object in the surroundings reflecting emitted radar signals 12 is located. Correspondingly, the relative speed-dependent portion indicates the specific relative speed with which the at least one object is moving in relation to the radar sensor.

With the aid of the method described hereinafter, the measuring signals of the radar sensor are evaluated, in particular, a Fourier transform being performed utilizing measuring signals from at least two different measuring cycles 10 and/or utilizing evaluation signals derived from the measuring signals from at least two different measuring cycles 10. This is explained in greater detail below.

In the method described herein in accordance with the present invention, first of all, a Fourier transform 18 with respect to baseband frequency $f_B$ is performed for each chirp 16 of at least two different measuring cycles 10. In this way, in each case a plurality of Fourier series 20 is determined for each measuring cycle 10 of the at least two different measuring cycles 10. Thus, a total number of Fourier series 20 determined per measuring cycle 10 of the at least two different measuring cycles 10 corresponds to a total number of chirps 16 per measuring cycle 10.

Fourier transforms 18 with respect to baseband frequency $f_B$ may also be referred to as fast Fourier transforms (FFT) 18. Fourier series 20 determined using fast Fourier transforms 18 all have the same total number of bins. Fourier transforms 18 with respect to baseband frequency $f_B$ result in a "span of a first dimension $f_B$" regarding the specific distance of the at least one reflecting object in the area surrounding the radar sensor. The at least one reflecting object in the area surrounding the radar sensor in each case causes a peak P1 in determined Fourier series 20, although peaks P1 of objects at the same distance from the radar sensor may superimpose in spite of their different relative speeds.

In a further method step represented schematically in FIG. 1b, a further Fourier transform 22 with respect to a Doppler frequency $f_D$ is performed for each measuring cycle 10 of the at least two different measuring cycles 10 utilizing the plurality of Fourier series 20 determined for respective measuring cycle 10. One may also describe this further Fourier transform 22 as a group of one Fourier transform 22 each for every bin of the plurality of Fourier series 20 of respective measuring cycle 10. In this way, a two-dimensional Fourier array 24 is determined for respective measuring cycle 10. The functional schema of FIG. 1b thus represents a two-dimensional fast Fourier transform, a so-called 2D-FFT. A first dimension $f_B$ of two-dimensional Fourier array 24 determined in this manner is the specific distance of the at least one reflecting object in the area surrounding the radar sensor, while a second dimension $f_D$ of two-dimensional Fourier array 24 in each case represents the relative speed of the at least one reflecting object in the area surrounding the radar sensor. Two-dimensional Fourier array 24 determined for each measuring cycle 10 may also be referred to as a 2D-spectrum of respective measuring cycle 10. The at least one reflecting object in the area surrounding the radar sensor in each case also causes a peak P2 in two-dimensional Fourier array 24. Superimpositions of peaks P2 in two-dimensional Fourier array 24 may be eliminated with the aid of the method step described below:

As a further method step, the functional schema of FIG. 1c shows Fourier transform 26, which is performed utilizing two-dimensional Fourier arrays 24 derived from the measuring signals from at least two different measuring cycles 10. Fourier transform 26 is performed with respect to a variable $f_3$ relevant in terms of the Doppler effect, in each case a fast Fourier transform (FFT) preferably being carried out for each bin of two-dimensional Fourier arrays 24. In this way, a three-dimensional Fourier matrix 28, or a so-called 3D-FFT, is obtained for a certain number of evaluated measuring cycles 10. Thus, Fourier transform 26 expands previously determined two-dimensional Fourier arrays 24, by a third dimension with respect to variable $f_3$ relevant in terms of the Doppler effect. The third dimension may be calculated for every possible relative speed. Depending on the dimensioning of the radar parameters, it may be advantageous to take the changing distance of the target into account via the measurements. Preferably, the third dimension is spanned for each bin of two-dimensional Fourier arrays 24.

A number of measuring cycles 10, from whose two-dimensional Fourier arrays 24 three-dimensional Fourier matrix 28 is determined, may be between 2 and 15, for example. Preferably, the number of measuring cycles 10 evaluated to determine three-dimensional Fourier matrix 28 lies between 5 and 10.

Since the data for generating three-dimensional Fourier matrix 28 comes from at least two different measuring cycles 10, three-dimensional Fourier matrix 28 makes it possible to observe the at least one reflecting object in the area surrounding the radar sensor over what is referred to as an integration time $T_{total}$, which extends from the beginning of the earliest of the at least two different measuring cycles 10 to the end of the last of the at least two different measuring cycles 10. Integration time $T_{total}$ is thus considerably longer than measuring-cycle time $\Delta t_m$ or total cycle time $\Delta T$. Consequently, the method described here allows "uninterrupted observation" of the at least one reflecting object in the area surrounding the radar sensor for a time period equal to integration time $T_{total}$, without the radar sensor having to perform measurements for that purpose for entire integration time $T_{total}$. As a result, the radar sensor may be inactive at least once for pause time $\Delta t_b$ during integration time $T_{total}$, while three-dimensional Fourier matrix 28 nevertheless indicates information about the at least one reflecting object in the area surrounding the radar sensor, just as though the radar sensor were to perform uninterrupted measurements during entire integration time $T_{total}$. Integration time $T_{total}$ may easily be selected to be so long that in the case of an uninterrupted measuring cycle, there would be a high risk of the radar sensor overheating during a period of time of such a length.

The example method described here therefore allows "uninterrupted observation" of the at least one reflecting object in the area surrounding the radar sensor even for a long integration time $T_{total}$, without having to accept overheating of the radar sensor, as well. Instead, a desired temperature of the radar sensor may be maintained without difficulty with the aid of the at least one pause time $\Delta t_b$ during integration time $T_{total}$. At the same time, the "uninterrupted observation" for relatively long integration time $T_{total}$ permits a good signal noise ratio (SNR) and improved separability of the individual objects in the area surrounding the radar sensor compared to the related art, and consequently reliable avoidance of ambiguities. In particular, the so-called third dimension with respect to variable $f_3$ relevant in terms of the Doppler effect ensures improved separability of several targets on the basis of their differences in the third dimension, and thus also increased Doppler separability. The at least one reflecting object in the area surrounding the radar sensor in each instance also causes a peak P3 in three-dimensional Fourier matrix 28, although superimposition of peaks P3 of various objects is never/scarcely able to occur.

It is pointed out that the advantages described above are ensured even while maintaining a comparatively long pause time $\Delta t_b$ between two successive measuring cycles 10, or given a relatively low duty cycle. Utilizing the method described here, it is therefore possible to prolong the "uninterrupted observation" of the at least one reflecting object in the area surrounding the radar sensor while maintaining pause time $\Delta t_b$ and the duty cycle, at the same time, the radar sensor being able to cool off long enough during pause time $\Delta t_b$ maintained between measuring cycles 10, that there is no need to fear the radar sensor will overheat.

Three-dimensional Fourier matrix 28 may also be determined utilizing a "sliding discrete Fourier transform" (sliding DFT). To that end, after each measuring cycle 10, the measured values of the "oldest measuring cycle 10" of a previously determined three-dimensional Fourier matrix 28 may be replaced by the measured values of the "most recent measuring cycle 10," possibly using a phase term for the correction. Computing time for determining three-dimensional Fourier matrix 28 may be reduced significantly in this manner. In order to reduce computation effort, it is also possible to determine the third dimension of three-dimensional Fourier matrix 28 only for relative speeds regarded as especially relevant.

Figure 2:
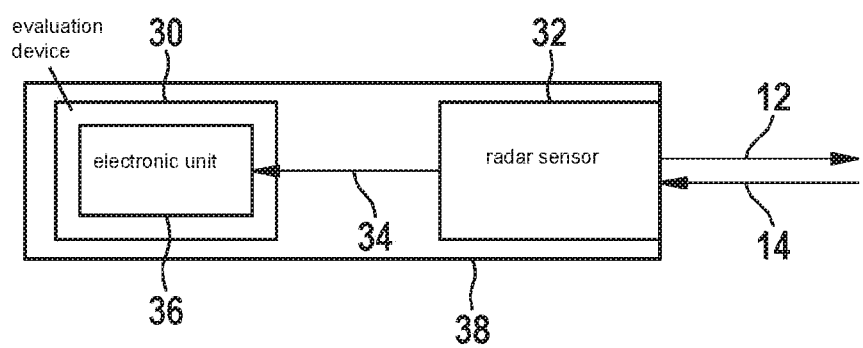
FIG. 2 shows a schematic representation of one specific embodiment of the evaluation device, or of the radar device formed with it, in accordance with the present invention.

FIG. 2 shows a schematic representation of one specific embodiment of the evaluation device, or more specifically, the radar device formed with it.

Evaluation device 30 shown schematically in FIG. 2 is adapted to cooperate with at least one radar sensor 32. Respective radar sensor 32 is designed in order, during its measuring cycles, to emit radar signals 12 and to receive radar signals 14 reflected from a surrounding area (not shown) of radar sensor 32 and to output measuring signals 34 corresponding to the received reflected radar signals, while radar sensor 32 remains inactive for a predetermined pause time between two successive measuring cycles. For example, the at least one radar sensor 32 cooperating with evaluation device 30 may be an FMCW (Frequency Modulated Continuous Wave) radar sensor, a JSFMCW (Joint Sampling Frequency Modulated Continuous Wave) radar sensor, an OFDM (Orthogonal Frequency-Division Multiplexing) radar sensor and/or a PN (Pseudo-random Noise) radar sensor. However, usability of evaluation device 30 is not limited to these types of radar sensor.

Evaluation device 30 has an electronic unit 36 which is designed to evaluate measuring signals 34 of radar sensor 32. Above all, electronic unit 36 is designed to perform a Fourier transform utilizing measuring signals 34 from at least two different measuring cycles and/or utilizing evaluation signals derived from measuring signals 34 from at least two different measuring cycles. Preferably, electronic unit 36 is designed to perform this Fourier transform with respect to a variable relevant in terms of the Doppler effect.

As is clear from the above description, electronic unit 36 may be designed in particular to perform a Fourier transform with respect to a baseband frequency for each chirp of the at least two different measuring cycles, and thus in each case to determine a plurality of Fourier series for each measuring cycle of the at least two different measuring cycles. Electronic unit 36 may subsequently perform a further Fourier transform with respect to a Doppler frequency for each measuring cycle of the at least two different measuring cycles, utilizing the plurality of Fourier series determined for the respective measuring cycle, and thus in each case to determine a 2-dimensional Fourier array for the respective measuring cycle. The Fourier transform carried out employing the evaluation signals derived from measuring signals 34 from at least two different measuring cycles is then performed utilizing the 2-dimensional Fourier arrays of the at least two different measuring cycles. In particular, the method described above is able to be executed with the aid of electronic unit 36.

In the specific embodiment of FIG. 2, evaluation device 30 is part of a radar device 38 formed with the at least one radar sensor 32. However, evaluation device 30 may also cooperate (as "separate device") with at least one radar sensor formed separately from it.

What is claimed is:

1. An evaluation device for at least one radar sensor, comprising:
    an electronic unit configured to evaluate measuring signals of the radar sensor;
    wherein the radar sensor is configured, during its measuring cycles, to emit radar signals and to receive radar signals reflected from an area surrounding the radar sensor, and to output signals corresponding to the received reflected radar signals as the measuring signals, the radar sensor remaining inactive for a predetermined pause time between two successive measuring cycles, wherein the electronic unit is configured to perform a Fourier transform using: (i) the measuring signals from at least two different measuring cycles and/or (ii) evaluation signals derived from the measuring signals from the at least two different measuring cycles, wherein the pause time is selected so that heating of radar-sensor components is prevented by the pause time observed in each case between two successive measuring cycles, wherein the pause time is between at least 5 milliseconds (ms) and no more than 100 ms, and wherein an integration time is longer than a measuring-cycle time or a total cycle time, so that there is uninterrupted observation of at least one reflecting object in an area surrounding the radar sensor for a time period equal to the integration time, without the radar sensor having to perform measurements for the integration time, so that the radar sensor is inactive at least once for the pause time during the integration time, while a multi-dimensional Fourier matrix indicates information about the at least one reflecting object in the area surrounding the radar sensor, just as though the radar sensor were to perform uninterrupted measurements during the integration time.

2. The evaluation device as recited in claim 1, wherein the electronic unit is configured to perform the Fourier transform with respect to a variable relevant in terms of Doppler effect, utilizing the measuring signals from the at least two different measuring cycles and/or utilizing the evaluation signals derived from the measuring signals from that at least two different measuring cycles.

3. The evaluation device as recited in claim 1, wherein the electronic unit is configured to perform a Fourier transform with respect to a baseband frequency for each chirp of the at least two different measuring cycles, and thus in each instance to determine a plurality of Fourier series for each measuring cycle of the at least two different measuring cycles, and to perform the Fourier transform carried out utilizing the evaluation signals derived from the measuring signals from the at least two different measuring cycles, by utilizing the plurality of Fourier series of the at least two different measuring cycles and/or utilizing evaluation signals derived from the plurality of Fourier series of the at least two different measuring cycles.

4. The evaluation device as recited in claim 3, wherein the electronic unit is configured to perform a further Fourier transform with respect to a Doppler frequency for each measuring cycle of the at least two different measuring cycles utilizing the plurality of Fourier series determined for the respective measuring cycle, and thus in each instance to determine a 2-dimensional Fourier array for the respective measuring cycle, and to perform the Fourier transform carried out utilizing the evaluation signals derived from the measuring signals from the at least two different measuring cycles, by utilizing the 2-dimensional Fourier arrays of the at least two different measuring cycles.

5. A radar device, comprising:
at least one radar sensor; and
an evaluation device for the at least one radar sensor, including:
an electronic unit to evaluate measuring signals of the radar sensor;

wherein the radar sensor is configured, during its measuring cycles, to emit radar signals and to receive radar signals reflected from an area surrounding the radar sensor, and to output signals corresponding to the received reflected radar signals as the measuring signals, while the radar sensor remains inactive for a predetermined pause time between two successive measuring cycles, wherein the electronic unit is configured to perform a Fourier transform using: (i) the measuring signals from at least two different measuring cycles; and/or (ii) evaluation signals derived from the measuring signals from the at least two different measuring cycles, and wherein the pause time is selected so that heating of radar-sensor components is prevented by the pause time observed in each case between two successive measuring cycles, wherein the pause time is between at least 5 milliseconds (ms) and no more than 100 ms, and wherein an integration time is longer than a measuring-cycle time or a total cycle time, so that there is uninterrupted observation of at least one reflecting object in an area surrounding the radar sensor for a time period equal to the integration time, without the radar sensor having to perform measurements for the integration time, so that the radar sensor is inactive at least once for the pause time during the integration time, while a multi-dimensional Fourier matrix indicates information about the at least one reflecting object in the area surrounding the radar sensor, just as though the radar sensor were to perform uninterrupted measurements during the integration time.

6. The radar device as recited in claim 5, wherein each of the at least one radar sensor is an FMCW radar sensor and/or a JSFMCW radar sensor.

7. A method for evaluating at least one radar sensor, the method comprising:
evaluating measuring signals of the radar sensor, which, during its measuring cycles, emits radar signals and receives radar signals reflected from an area surrounding the radar sensor, and outputs signals corresponding to the received reflected radar signals as the measuring signals but remains inactive for a predetermined pause time between two successive measuring cycles;

wherein the evaluation includes performing a Fourier transform utilizing the measuring signals from at least two different measuring cycles, and/or utilizing evaluation signals derived from the measuring signals from the at least two different measuring cycles, and wherein the pause time is selected so that heating of radar-sensor components is prevented by the pause time observed in each case between two successive measuring cycles, wherein the pause time is between at least 5 milliseconds (ms) and no more than 100 ms, and wherein an integration time is longer than a measuring-cycle time or a total cycle time, so that there is uninterrupted observation of at least one reflecting object in an area surrounding the radar sensor for a time period equal to the integration time, without the radar sensor having to perform measurements for the integration time, so that the radar sensor is inactive at least once for the pause time during the integration time, while a multi-dimensional Fourier matrix indicates information about the at least one reflecting object in the area surrounding the radar sensor, just as though the radar sensor were to perform uninterrupted measurements during the integration time.

8. The method as recited in claim 7, wherein the Fourier transform with respect to a variable relevant in terms of Doppler effect is performed utilizing the measuring signals from the at least two different measuring cycles and/or utilizing the evaluation signals derived from the measuring signals from the at least two different measuring cycles.

9. The method as recited in claim 7, wherein a Fourier transform with respect to a baseband frequency is performed for each chirp of the at least two different measuring cycle, and thus, in each instance, a plurality of Fourier series is determined for each measuring cycle of the at least two different measuring cycles, and the Fourier transform carried out utilizing the evaluation signals derived from the measuring signals from the at least two different measuring cycles, is performed utilizing the plurality of Fourier series of the at least two different measuring cycles and/or utilizing evaluation signals derived from the plurality of Fourier series of the at least two different measuring cycles.

10. The method as recited in claim 9, wherein a further Fourier transform with respect to a Doppler frequency is performed for each measuring cycle of the at least two different measuring cycles utilizing the plurality of Fourier series determined for the respective measuring cycle, and thus, in each instance, a 2-dimensional Fourier array is determined for the respective measuring cycle, and the Fourier transform carried out utilizing the evaluation signals derived from the measuring signals from at least two different measuring cycles, is performed utilizing the 2-dimensional Fourier arrays of the at least two different measuring cycles.

* * * * *